(12) United States Patent
Hendren et al.

(10) Patent No.: US 8,125,344 B2
(45) Date of Patent: Feb. 28, 2012

(54) PORTABLE COMPUTER BATTERY INDICATOR

(75) Inventors: Keith J. Hendren, Capitola, CA (US); Bartley K Andre, Menlo Park, CA (US); Duncan R. Kerr, San Francisco, CA (US); Christopher Stringer, Woodside, CA (US); Daniel J. Coster, San Francisco, CA (US); Chris Ligtenberg, San Carlos, CA (US); John Brock, San Francisco, CA (US); Tom Wilson, Saratoga, CA (US); Dinesh Mathew, Fremont, CA (US); Brett W. Degner, Menlo Park, CA (US); Tomas E. Ponce, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 410 days.

(21) Appl. No.: 12/340,635

(22) Filed: Dec. 19, 2008

(65) Prior Publication Data
US 2010/0090847 A1    Apr. 15, 2010

Related U.S. Application Data

(60) Provisional application No. 61/105,040, filed on Oct. 13, 2008.

(51) Int. Cl.
*G08B 21/10* (2006.01)
(52) U.S. Cl. ............... 340/636.1; 320/110; 320/111; 320/112; 320/113; 320/114; 324/426; 324/436
(58) Field of Classification Search ............... 340/636.1; 320/110–115; 324/426, 436
See application file for complete search history.

(56) References Cited

U.S. PATENT DOCUMENTS

| | | | |
|---|---|---|---|
| 3,568,139 A | 3/1971 | Delzer | |
| 4,224,383 A | 9/1980 | Taylor | |
| 4,270,827 A | 6/1981 | Potgieter | |
| 4,473,264 A | 9/1984 | Julian et al. | |
| 4,920,018 A | 4/1990 | Turner | |
| 4,991,058 A | 2/1991 | Watkins et al. | |
| 5,155,662 A | 10/1992 | I-Shou | |
| 5,169,338 A | 12/1992 | Dewar et al. | |
| 5,187,643 A | 2/1993 | I-Shou | |
| 5,317,305 A * | 5/1994 | Campman | 340/573.1 |
| 5,323,291 A | 6/1994 | Boyle et al. | |
| 5,325,984 A | 7/1994 | Ady et al. | |
| 5,346,407 A | 9/1994 | Hood | |
| 5,477,129 A * | 12/1995 | Myslinski | 340/636.1 |
| 5,566,048 A | 10/1996 | Esterberg et al. | |
| 5,572,402 A | 11/1996 | Jeong | |
| 5,670,267 A | 9/1997 | Lee | |

(Continued)

*Primary Examiner* — George Bugg
*Assistant Examiner* — Ojiako Nwugo
(74) *Attorney, Agent, or Firm* — Treyz Law Group; G. Victor Treyz; David C. Kellogg

(57) ABSTRACT

A portable computer may include battery indicator light structures. Battery status information in the portable computer may be presented to a user using an array of light-emitting diodes or other light emitters. Light-emitting diodes may be mounted on a printed circuit board. A stiffener may provide the printed circuit board with rigidity. The printed circuit board may include a connector that allows the board to be connected to a main logic board. A switch on the printed circuit board may be actuated by a power button on the portable computer. An opaque member with an array of holes may be used to reduce light bleed between adjacent light-emitting diodes. Diffusing plastic may be mounted within the array of holes. Bumps in the diffusing plastic may mate with corresponding holes on a portable computer housing.

17 Claims, 3 Drawing Sheets

U.S. PATENT DOCUMENTS

| | | | |
|---|---|---|---|
| 5,801,345 A * | 9/1998 | Mikula-Curtis et al. | 200/5 A |
| 5,808,864 A | 9/1998 | Jung | |
| 5,895,440 A | 4/1999 | Proctor et al. | |
| RE36,381 E | 11/1999 | Boyle et al. | |
| 6,068,520 A | 5/2000 | Winings et al. | |
| 6,249,426 B1 | 6/2001 | O'Neal et al. | |
| 6,297,946 B2 | 10/2001 | O'Neal et al. | |
| 6,304,060 B1 | 10/2001 | Dernichi | |
| 6,304,433 B2 | 10/2001 | O'Neal et al. | |
| 6,413,120 B1 | 7/2002 | Winings | |
| 6,477,035 B1 | 11/2002 | Cepas et al. | |
| 6,483,719 B1 | 11/2002 | Bachman | |
| 6,501,644 B1 | 12/2002 | Silverman et al. | |
| 6,660,427 B1 | 12/2003 | Hukill et al. | |
| 6,751,484 B1 | 6/2004 | Sandelius et al. | |
| 6,781,827 B2 | 8/2004 | Goodman et al. | |
| 6,879,259 B1 | 4/2005 | Smith et al. | |
| 6,887,616 B2 | 5/2005 | Kim et al. | |
| 7,013,558 B2 | 3/2006 | Bachman | |
| 2004/0070990 A1 * | 4/2004 | Szypszak | 362/555 |
| 2005/0094392 A1 * | 5/2005 | Mooney | 362/241 |
| 2006/0012969 A1 | 1/2006 | Bachman | |
| 2006/0067077 A1 * | 3/2006 | Kumthampinij et al. | 362/294 |
| 2006/0141344 A1 | 6/2006 | Chen et al. | |
| 2006/0172183 A1 | 8/2006 | Chen et al. | |
| 2007/0031727 A1 | 2/2007 | Hsu | |
| 2007/0111086 A1 | 5/2007 | Li et al. | |
| 2007/0117598 A1 | 5/2007 | Yang et al. | |
| 2007/0151751 A1 | 7/2007 | Robbins et al. | |
| 2008/0013268 A1 | 1/2008 | Wong et al. | |
| 2008/0084404 A1 * | 4/2008 | Andre et al. | 345/204 |
| 2009/0071748 A1 * | 3/2009 | Fuerstenberg et al. | 181/292 |
| 2009/0096347 A1 * | 4/2009 | Xu | 313/498 |
| 2009/0134409 A1 * | 5/2009 | Wang et al. | 257/89 |
| 2009/0176080 A1 * | 7/2009 | Lai et al. | 428/220 |
| 2009/0183689 A1 * | 7/2009 | Moore et al. | 119/712 |
| 2009/0206059 A1 * | 8/2009 | Kiko | 218/143 |

* cited by examiner

PORTABLE COMPUTER BATTERY INDICATOR

This application claims the benefit of provisional patent application No. 61/105,040, filed Oct. 13, 2008, which is hereby incorporated by reference herein in its entirety.

BACKGROUND

This invention relates to electronic devices and, more particularly, to battery indicator structures for electronic devices such as portable computers.

Portable computers often are provided with indicator lights. For example, a light-emitting diode may be provided on the surface of a portable computer that indicates whether or not the portable computer is powered. Battery status information may also be conveyed using light-emitting diodes. For example, a portable computer may have a light-emitting diode that is illuminated when the battery in the portable computer is fully charged.

Conventional indicators are often unsightly and do not convey sufficient information to a computer user.

It would therefore be desirable to be able to provide improved battery indicator structures for electronic devices such as portable computers.

SUMMARY

Portable computers with improved battery charge status indicator lights are provided.

A portable computer may be provided with a metal housing. An array of holes may be formed in the housing. A light-emitting diode array may be mounted behind the holes. The pattern of light-emitting diodes in the array that are lit at any given time may be indicative of the battery charge status of the battery in the portable computer.

Light-emitting diodes for the light-emitting diode array may be mounted on a printed circuit board. An opaque member may be provided that contains an array of holes. The array of holes on the opaque member may be aligned with the array of light-emitting diodes on the printed circuit board and the array of holes in the housing. Light diffusing material may be incorporated into the holes of the opaque member to improve the appearance of the light emitted from the housing.

Further features of the invention, its nature, and various advantages will be more apparent from the accompanying drawings and the following detailed description of the preferred embodiments.

DETAILED DESCRIPTION

The present invention relates to electronic devices with indicator lights. The indicator lights may be used to convey information such as battery charge status information or other information about the operation of the electronic device to a user of an electronic device. The electronic device may be a handheld computer, a miniature or wearable device, a portable computer, a desktop computer, a mobile telephone, a music player, a remote control, a global positioning system device, devices that combine the functions of one or more of these devices and other suitable devices, or any other electronic device. With one suitable arrangement, which is sometimes described herein as an example, the electronic devices in which the indicator lights are provided may be portable computers such as laptop (notebook) computers. This is, however, merely illustrative. Indicators lights may, in general, be provided in any suitable electronic device.

Figure 1:
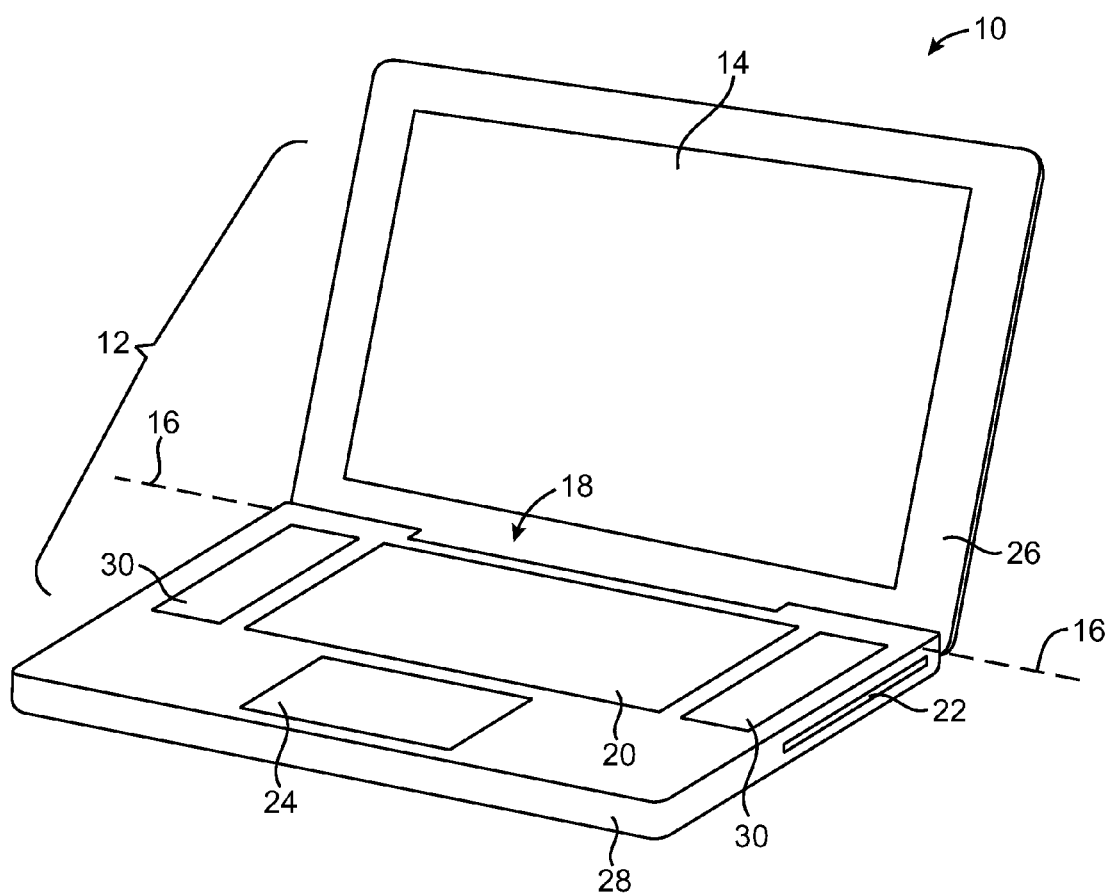
FIG. 1 is a perspective view of an illustrative portable computer in accordance with an embodiment of the present invention.

An illustrative electronic device such as a portable computer in which indicator lights may be provided is shown in FIG. 1. As shown in FIG. 1, portable computer 10 may have a housing 12. Housing 12, which is sometimes referred to as a case, may be formed from one or more individual structures. For example, housing 12 may have a main structural support member that is formed from a solid block of machined aluminum or other suitable metal. One or more additional structures may be connected to the housing 12. These structures may include, for example, internal frame members, external coverings such as sheets of metal, etc. Housing 12 and its associated components may, in general, be formed from any suitable materials such as such as plastic, ceramics, metal, glass, etc. An advantage of forming housing 12 at least partly from metal is that metal is durable and attractive in appearance. Metals such as aluminum may be anodized to form an insulating oxide coating.

Case 12 may have an upper portion 26 and a lower portion 28. Lower portion 28 may be referred to as the base or main unit of computer 10 and may contain components such as a hard disk drive, battery, and main logic board. Upper portion 26, which is sometimes referred to as a cover or lid, may be rotatably connected to lower housing portion 28. For example, portion 18 of computer 10 may allow upper portion 26 to rotate relative to lower portion 28 about rotational axis 16. Portion 18 may contain a hinge and associated clutch structures and may sometimes be referred to as a clutch barrel.

Lower housing portion 28 may have a slot such as slot 22 through which optical disks may be loaded into an optical disk drive. Lower housing portion may also have a touchpad such a touchpad 24 and keys 20. If desired, additional components may be mounted to upper and lower housing portions 26 and 28. For example, upper and lower housing portions 26 and 28 may have ports to which cables may be connected (e.g., universal serial bus ports, an Ethernet port, a Firewire port, audio jacks, card slots, etc.). Buttons and other controls may also be mounted to housing 12.

If desired, upper and lower housing portions 26 and 28 may have transparent windows through which light may be emitted (e.g., from light-emitting diodes). This type of arrangement may be used, for example, to display status information to a user. Openings may also be formed in the surface of upper and lower housing portions to allow sound to pass through the walls of housing 12. For example, openings may be formed for microphone and speaker ports. With one illustrative arrangement, speaker openings such as speaker openings 30 may be formed in lower housing portion 28 by creating an array of small openings (perforations) in the surface of housing 12.

A display such as display 14 may be mounted within upper housing portion 26. Display 14 may be, for example, a liquid crystal display (LCD), organic light emitting diode (OLED) display, or plasma display (as examples). A glass panel may be mounted in front of display 14. The glass panel may help add structural integrity to computer 10. For example, the glass panel may make upper housing portion 26 more rigid and may protect display 14 from damage due to contact with keys or other structures.

Computer 10 may have input-output components such as touch pad 24. Touch pad 24 may include a touch sensitive surface that allows a user of computer 10 to control computer 10 using touch-based commands (gestures). A portion of touchpad 24 may be depressed by the user when the user desires to "click" on a displayed item on screen 14.

Figure 2:
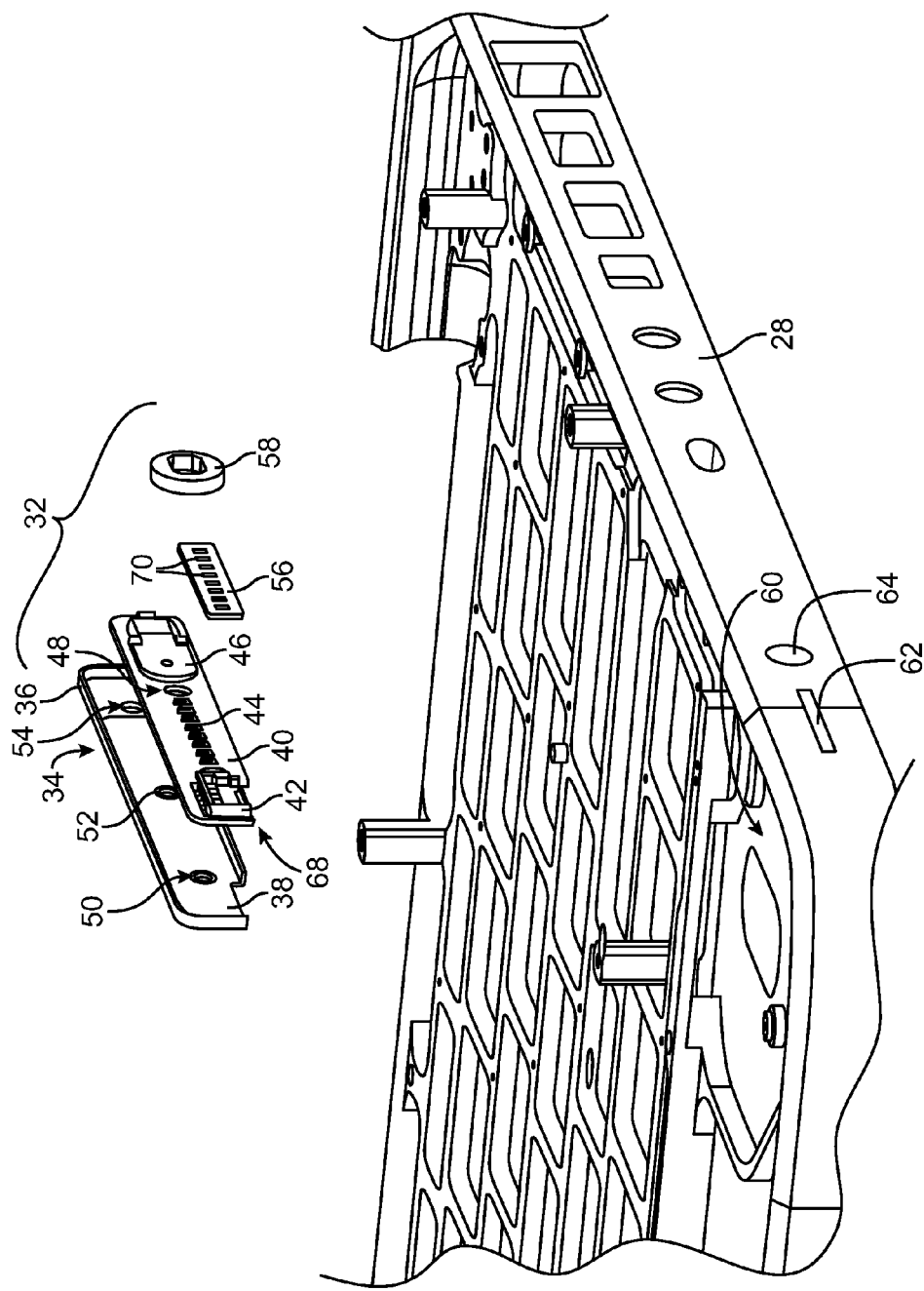
FIG. 2 is an exploded view of an illustrative battery indicator light assembly in accordance with an embodiment of the present invention.

FIG. 2 is an exploded perspective view of a battery indicator light subassembly that may be used to provide a user with a visual indication of battery status. The structures of FIG. 2 may include an array of light-emitting diodes or other suitable light emitting devices. The pattern of light-emitting diodes that is illuminated for the user may be used to indicate the amount of charge on the battery in computer 10. As an example, all of the lights in the array may be illuminated when the battery is fully charged and proportionally fewer lights may be illuminated when there is less charge on the battery.

As shown in FIG. 2, battery indicator light subassembly 32 may include a printed circuit board 68. Printed circuit board 68 may have a printed circuit board substrate 40. Substrate 40 may be formed from a rigid printed circuit board material such as fiberglass-filled epoxy or a flexible printed circuit board ("flex circuit") material such as polyimide. Components may be mounted on substrate 40 such as connector 42 and button mechanism 46.

Computer 10 may include one or more printed circuit boards, such as a main logic board. Components such as a microprocessor, memory, and associated integrated circuits may be mounted on the main logic board. The main logic board may have a connector through which control signals for battery indicator subassembly 32 are provided. A flex circuit cable or other suitable electrical cable may be used to convey control signals between the main logic board and battery indicator light subassembly 32. One end of the cable may be plugged into the connector on the main logic board. The other end of the cable may be plugged into connector 42 on substrate 40 of battery indicator light printed circuit board 68. This arrangement allows circuitry on the main logic board to drive light-emitting diodes in subassembly 32. If desired, other control arrangements may be used. For example, control circuitry on a logic board other than the main logic board may be used in controlling the light-emitting diodes or control circuitry for the light-emitting diodes may be incorporated onto printed circuit board 68.

Button mechanism 46 may be formed from any suitable mechanical or electrical switch structure. Subassembly 32 may be mounted in computer 10 in region 60 of housing portion 28. When mounted in this way, button mechanism 46 may be aligned with button 64 on housing portion 28. Button 64 may be formed from a metal disk or other suitable structure. To provide a spring mechanism for button 64, an elastomeric ring such as ring 58 may be interposed between the inside surface of button 64 and the outer surface of button mechanism 46. When a user presses button 64, elastomeric member 58 (e.g., foam) may be compressed against button mechanism 46, thereby actuating button mechanism 46. Button 64 may be, for example, the main power button for computer 10.

Stiffener 34 may be used to enhance the structural integrity of subassembly 32 by providing stiffness for printed circuit board 68. Stiffener 34 may include a stiffening member 36. Member 36 may be formed from a metal such as stainless steel or other rigid materials such as plastic. Stiffener 34 may also include a layer of adhesive such as double-sided adhesive tape 38. Adhesive 38 may help to hold stiffener to the back of printed circuit board substrate 40. Stiffener 34 may have holes such as holes 50, 52, and 54. Screws in holes 50, 52, and 54 may be screwed into housing portion 28 to attach subassembly 32 to housing portion 28. The screws in outermost holes 50 and 54 may pass to either side of printed circuit board 68. The screw in central stiffener hole 52 may pass through corresponding hole 48 in printed circuit board substrate 40.

Battery indicator light array member 56 may have a series of holes though which light may pass before being emitted through holes in region 62 of housing portion 28. Member 56 may be formed from cast aluminum or other suitable opaque material. Screw holes may be provided in member 56 to facilitate mounting as part of subassembly 32. Because member 56 is preferably opaque, member 56 may help to separate individual light-emitting diodes from each other by preventing undesired light leakage. Light diffusing plastic 44 may be placed in holes 70 to enhance the uniformity of the light emitted by the light-emitting diodes on board 68. The holes in member 56 may be about 1.32 mm in diameter. Although shown as separate structures in the exploded view of FIG. 2, following fabrication (e.g., by injection molding), the light diffusing plastic 44 is preferably formed within the holes 70 and is prevented from exiting holes 70 by flared features on the entrance and exit of each hole 70.

Figure 3:
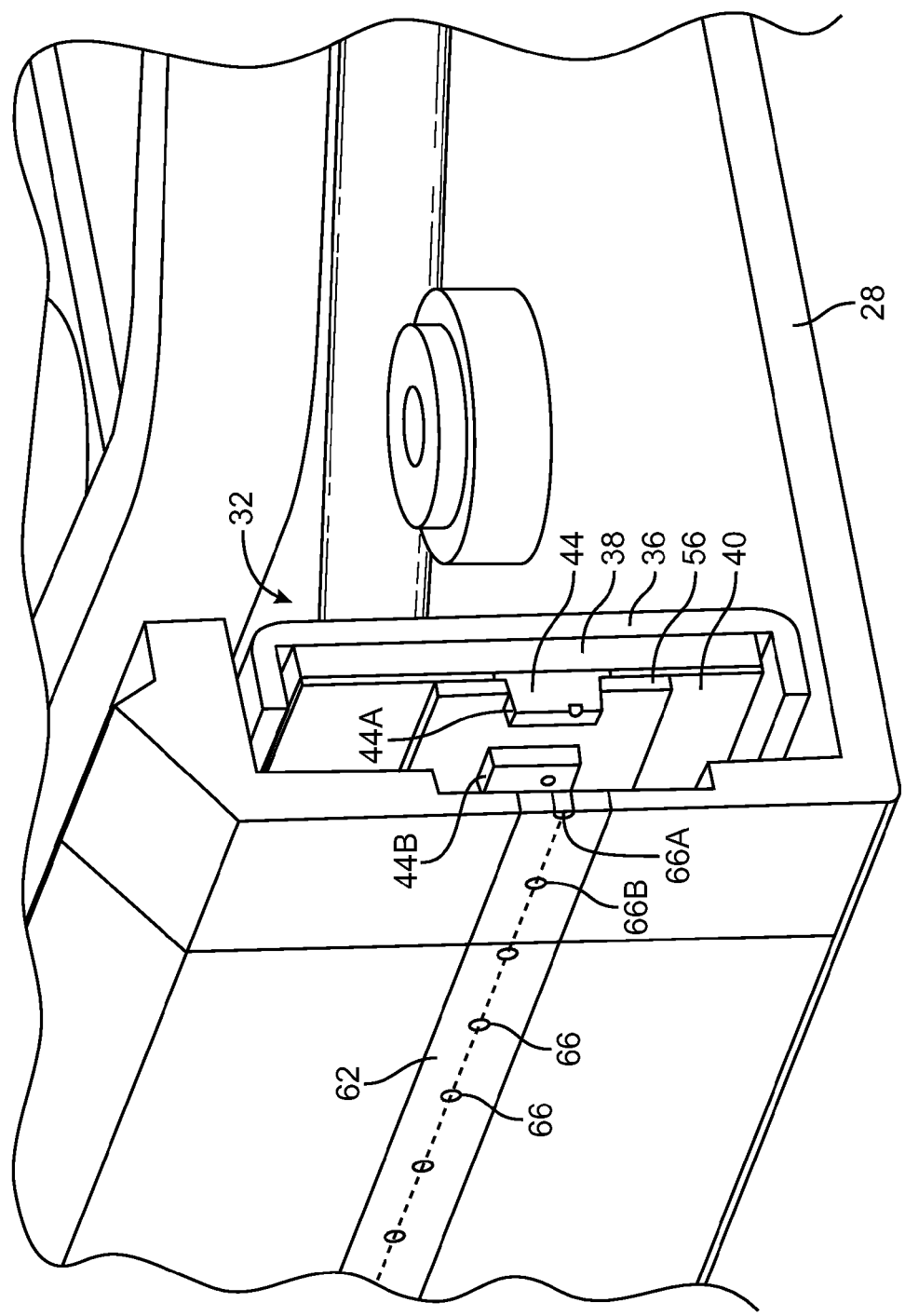
FIG. 3 is cross sectional perspective view of a portion of a portable computer having a battery indicator light assembly of the type shown in FIG. 2 in accordance with an embodiment of the present invention.

FIG. 3 shows how diffusing plastic 44 is formed within holes 70 of member 56 when subassembly 32 is mounted within housing portion 28. As shown in FIG. 3, light diffusing plastic 44 forms a series of raise bumps 44A, 44B, etc. Each bump in diffuser 44 corresponds to one of holes 66 in the sidewall of housing portion 28. For example, diffuser bump 44A is mounted in housing portion 28 so that light that passes through bump 44A will be emitted through housing sidewall hole 66A, diffuser bump 44B feeds light through holes 66B, etc. If desired, holes 66 may be filled with a clear ultraviolet-light-curable adhesive or other transparent filler to prevent blockage of holes 66 by dust. Holes 66 may be drilled into housing portion 28 using laser drilling, mechanical drilling, or other suitable fabrication techniques. Holes may, if desired, be relatively small (e.g., less than 0.8 mm in diameter, less than 0.6 mm in diameter, less than 0.4 mm in diameter, etc.). If desired, an array of holes 66 may be formed on a separate member that is subsequently mounted within a rectangular opening in housing portion 28 as an insert. Other arrangement may also be used (e.g., to support different numbers of holes, to support different patterns of indicator lights, etc.).

The foregoing is merely illustrative of the principles of this invention and various modifications can be made by those skilled in the art without departing from the scope and spirit of the invention.

What is claimed is:

1. A battery charge status indicator light subassembly, comprising:
   a printed circuit board substrate;
   an array of battery indicator light-emitting diodes;
   a battery indicator light array member adjacent to the array of battery indicator light-emitting diodes, wherein the battery indicator light array member comprises an opaque material having a plurality of holes, each hole in the battery indicator light array member being aligned with a respective one of the battery indicator light-emitting diodes; and light diffusing plastic located in the holes of the battery indicator light array member, wherein the light diffusing plastic in each hole comprises flared portions on at least one side of that hole.

2. The battery charge status indicator light subassembly defined in claim 1, further comprising:
a connector mounted on the printed circuit board.

3. The battery charge status indicator light subassembly defined in claim 2 further comprising a button mechanism mounted on the printed circuit board.

4. The battery charge status indicator light subassembly defined in claim 1 further comprising a button mechanism mounted on the printed circuit board.

5. The battery charge status indicator light subassembly defined in claim 4 further comprising a elastomeric ring adjacent to the button mechanism.

6. The battery charge status indicator light subassembly defined in claim 1 further comprising a stiffener mounted to the printed circuit board.

7. The battery charge status indicator light subassembly defined in claim 1 further comprising:
a layer of adhesive; and
a stiffener mounted to the printed circuit board with the layer of adhesive.

8. The battery charge status indicator light subassembly defined in claim 7 wherein the stiffener and the printed circuit board have portions defining mating screw holes.

9. The battery charge status indicator light subassembly defined in claim 1 wherein the battery indicator light array member comprises aluminum.

10. The battery charge status indicator light subassembly defined in claim 1 further comprising:
a button mechanism mounted on the printed circuit board.

11. An electronic device, comprising:
a housing having a plurality of battery indicator light holes;
a battery indicator light subassembly that is mounted within the housing and that has an array of battery indicator light-emitting diodes that are selectively illuminated to indicate battery charge status for the electronic device, each light-emitting diode being aligned with a respective one of the plurality of battery indicator light holes; and
a transparent filler within each of the plurality of holes in the housing, wherein the transparent filler comprises epoxy.

12. The electronic device defined in claim 11 wherein the epoxy comprises ultraviolet cured epoxy and wherein the holes are less than 0.4 mm in diameter.

13. The electronic device defined in claim 12 further comprising a power button that reciprocates within the housing, wherein the battery indicator light subassembly comprises a button mechanism and an elastomeric ring adjacent to the power button.

14. A portable computer, comprising:
a lower housing having a plurality of battery indicator light holes;
an upper housing rotatably mounted to the lower housing; and
a battery indicator light subassembly having an array of battery indicator light-emitting diodes that are selectively illuminated to indicate battery charge status for the portable computer, each light-emitting diode being aligned with a respective one of the plurality of battery indicator light holes.

15. The portable computer defined in claim 14 wherein the plurality of battery indicator light holes are each filled with a transparent filler, wherein the battery indicator light subassembly further comprises a button mechanism, and wherein the lower housing comprises regions defining a button hole within which a power button reciprocates to actuate the button mechanism.

16. The portable computer defined in claim 15 wherein the battery indicator light subassembly further comprises:
an opaque member having holes filled with light diffusing plastic, each of the holes in the opaque member being interposed between one of the light-emitting diodes and a respective one of the battery indicator light holes; and
an elastomeric member interposed between the power buttons and the button mechanism.

17. The portable computer defined in claim 14 wherein the lower housing has a top surface, a bottom surface, and four side surfaces and wherein the plurality of battery indicator holes are located in one of the side faces of the lower housing.

* * * * *